US008804214B2

(12) United States Patent
Ookawa et al.

(10) Patent No.: US 8,804,214 B2
(45) Date of Patent: Aug. 12, 2014

(54) MEDIUM TRANSPORT APPARATUS, IMAGE SCANNING APPARATUS AND IMAGE PROCESSING APPARATUS

(75) Inventors: Kei Ookawa, Tokyo (JP); Hidenori Ueda, Tokyo (JP)

(73) Assignee: Oki Data Corporation, Tokyo (JP)

( * ) Notice: Subject to any disclaimer, the term of this patent is extended or adjusted under 35 U.S.C. 154(b) by 660 days.

(21) Appl. No.: 13/064,310

(22) Filed: Mar. 17, 2011

(65) Prior Publication Data

US 2011/0228358 A1 Sep. 22, 2011

(30) Foreign Application Priority Data

Mar. 18, 2010 (JP) ................................. 2010-063094

(51) Int. Cl.
H04N 1/04 (2006.01)
(52) U.S. Cl.
USPC ........... 358/498; 358/474; 358/496; 271/277; 271/121
(58) Field of Classification Search
None
See application file for complete search history.

(56) References Cited

U.S. PATENT DOCUMENTS

| 4,570,061 | A | * | 2/1986 | Cooper et al. | 250/222.1 |
|---|---|---|---|---|---|
| 4,717,137 | A | * | 1/1988 | Leuthold | 271/97 |
| 5,594,542 | A | * | 1/1997 | Sugimoto et al. | 399/402 |
| 5,737,682 | A | * | 4/1998 | Yamagishi | 399/402 |
| 5,897,110 | A | * | 4/1999 | Fujiwara | 271/4.01 |
| 6,116,589 | A | * | 9/2000 | Bortolotti | 271/121 |
| 6,290,221 | B1 | * | 9/2001 | Taniyama | 271/3.14 |
| 2004/0145112 | A1 | * | 7/2004 | Matsutomo et al. | 271/207 |
| 2005/0023748 | A1 | * | 2/2005 | Hiramoto et al. | 271/303 |
| 2005/0248814 | A1 | * | 11/2005 | Yang | 358/498 |
| 2008/0179809 | A1 | * | 7/2008 | Kikkawa et al. | 270/58.11 |
| 2008/0230981 | A1 | * | 9/2008 | Iwami et al. | 271/153 |
| 2009/0189343 | A1 | * | 7/2009 | Hsu et al. | 271/277 |
| 2009/0295061 | A1 | * | 12/2009 | Honda et al. | 271/3.14 |
| 2010/0019442 | A1 | * | 1/2010 | Yoshida | 271/220 |

FOREIGN PATENT DOCUMENTS

| JP | 07-064359 A | 3/1995 |
|---|---|---|
| JP | 2000-089524 | 3/2000 |
| JP | 2006-151671 | 6/2006 |
| JP | 2011-190038 | 9/2011 |

* cited by examiner

Primary Examiner — King Poon
Assistant Examiner — Ted Barnes
(74) Attorney, Agent, or Firm — Rabin & Berdo, P.C.

(57) ABSTRACT

A medium transport apparatus includes a transport member configured to transport a medium in a discharge direction or in a drawing direction, a medium loaded member configured to be placed a medium transported in the discharge direction by the medium transport member, and a movement member. The movement member is configured to move in a direction away from the transport member when the transport member transports a medium in the drawing direction.

9 Claims, 9 Drawing Sheets

MEDIUM TRANSPORT APPARATUS, IMAGE SCANNING APPARATUS AND IMAGE PROCESSING APPARATUS

CROSS-REFERENCE TO RELATED APPLICATION

This application claims priority under 35 U.S.C. §119 from Japanese Patent Application NO. P 2010-063094, filed on Mar. 18, 2010, the disclosure of which is incorporated herein by reference.

BACKGROUND OF THE INVENTION

Field of the Invention

This application relates to a medium transport apparatus, and an image scanning apparatus. More particularly, this application relates to those apparatus which have an inversion transport path to reverse a medium and operate a re-drawing action (i.e., a switch-back action) on the mediums to transport it to the inversion transport path.

When a conventional image scanning apparatus scans characters or images which are printed on both sides of a medium using a reader unit, first the reader unit scans one side of the medium, and then the medium is reversed by a re-drawing action (i.e., switch-back action) and the reader unit scans the other side of the medium. The re-drawing action is an action to transport the medium to an inversion transport path by an ejection roller which sent a front end side of the medium away in an ejection tray and holds a rear end side of the medium and turns reversely, as mentioned in the Japanese Laid-Open Patent No. H 07-64359.

As described in the above patent medium, the front end side of the medium is temporarily provided onto the ejection tray while the rear end side thereof is being held by the ejection roller. The conventional image scanning apparatus as a image processing apparatus of an illustrative embodiment of the application has a trouble that the medium held by the ejection roller and a medium loaded on the ejection tray are drawn into the transport path by the back rotation of the ejection roller namely the re-drawing action (switch-back action). The trouble is not to limit only the image scanning apparatus. The trouble is in common for a medium transport apparatus and an image forming apparatus configured to operate a re-drawing action.

SUMMARY OF THE INVENTION

An object of the application is to disclose a medium transport apparatus includes a transport member configured to transport a medium in a discharge direction or in a drawing direction, a medium loaded member configured to be placed a medium transported in the discharge direction by the medium transport member, and a movement member configured to move in a direction away from the transport member when the transport member transports a medium in the drawing direction.

A BRIEF DESCRIPTION OF THE FIGURES

DETAILED DESCRIPTION OF THE INVENTION

First Embodiment

Figure 1:
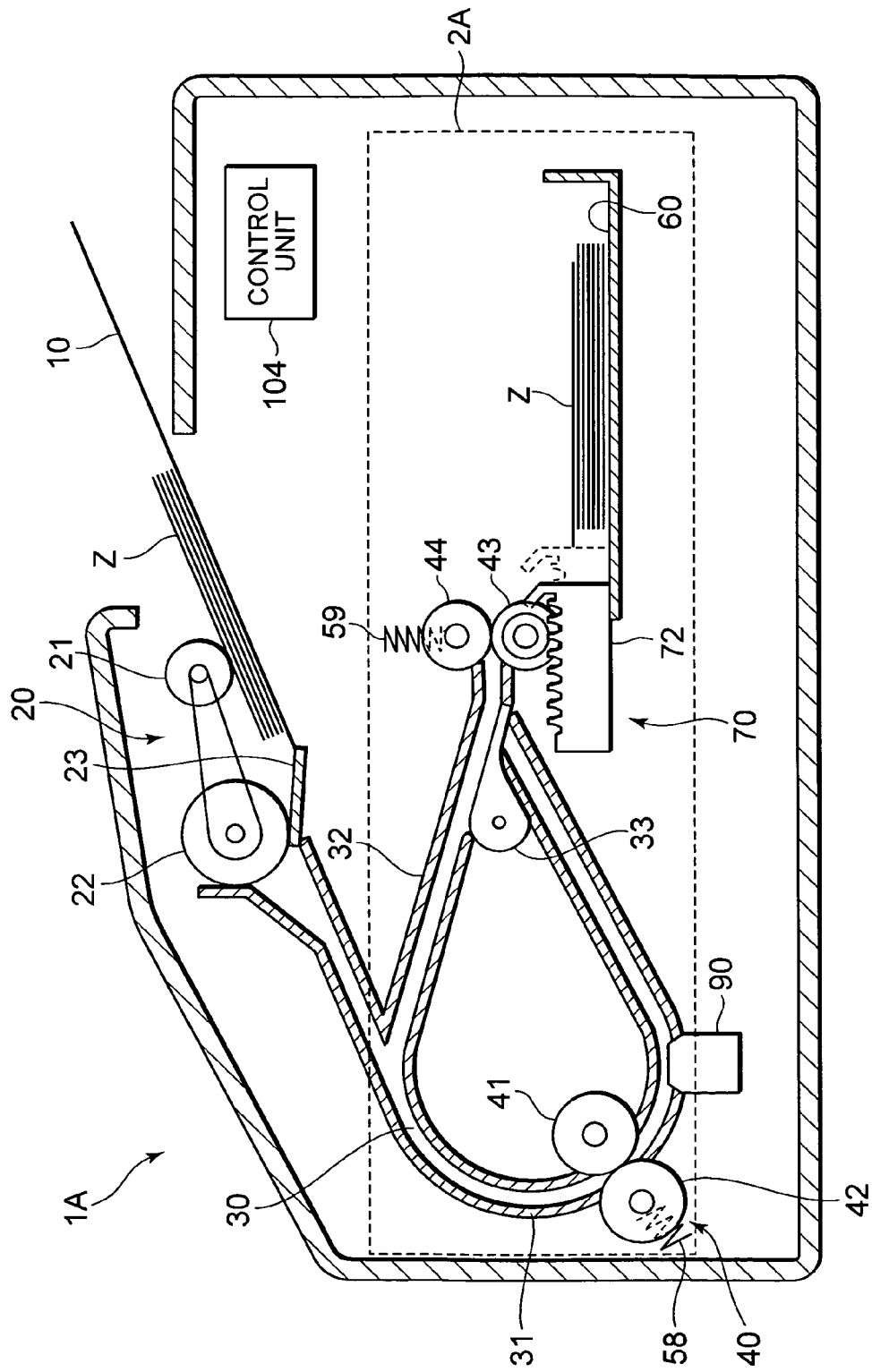
FIG. 1 is a side cross-sectional view that is in section view of the side of a medium scanning apparatus in a first embodiment.
Figure 2:
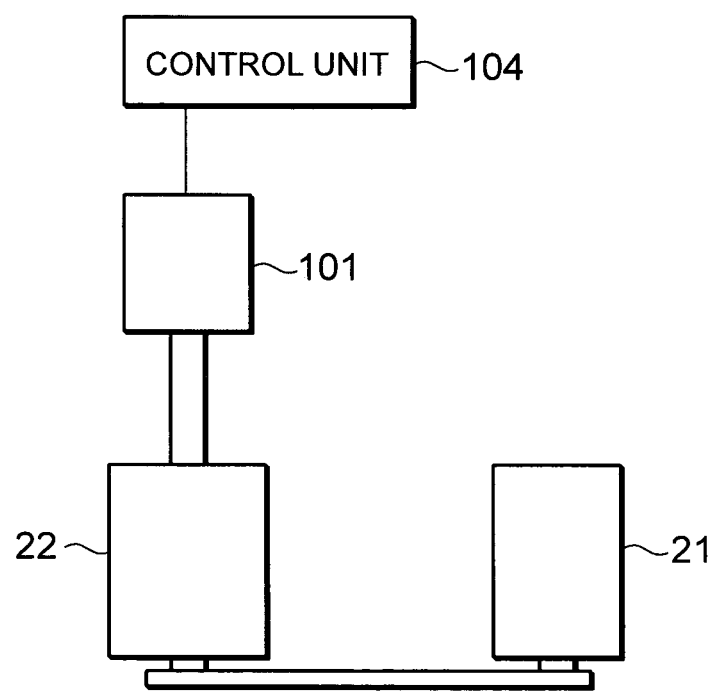
FIG. 2 is a plan view that is a planar view of a part of a discharge member in the first embodiment.

An image scanning apparatus as an image processing apparatus 1A and a medium transport apparatus 2A in a first embodiment are described referring from FIG. 1 to FIG. 5. The image scanning apparatus 1A scans information such as letters and figures which a medium Z as a medium has. The image scanning apparatus 1A may include at least a paper tray 10, a discharge member 20, a transport path 30, a transport member 40, an ejection tray 60 as a medium loaded member, a detaching member 70A as a movement member, and a scanning member 90 as an image processing member to operate an image processing of the medium, as shown in FIG. 1. The medium transport apparatus 2A may include at least the transport member 40, the ejection tray 60, and the detaching member 70A as the movement member, as shown in FIG. 1.

The paper tray 10 is loaded the medium Z, and may include a component like plane board which has the size in capable of loaded the medium Z. The paper tray 10 is provided to let an operator to be in capable of loaded the medium Z, and to expose where an upper side of the image scanning apparatus and the outside of a chassis, as shown in FIG. 1.

The discharge member 20 carries out the medium Z loaded on the paper tray 10 into the transport path 30 one by one. The discharge member 20 may include a pickup roller 21, a separation roller 22, and a separation pad 23, as shown in FIG. 1. The pickup roller 21 is axle supported in free rotation, and is provided at the position which is the front end side of medium Z loaded in the paper tray 10, to be in capable of contacting with the medium Z. Moreover, the pickup roller 21 is wound a belt or connected a gear, to follow a turning of a separation roller 22 as mentioned later. When the separation roller 22 turns, the pickup roller 21 turns and carries out the medium Z configured to contact with the pickup roller 21, into the transport path 30. The separation roller 22 turns with contacting with the separation pad as mentioned later, and sends off the medium Z sent off by the pickup roller 21 to the transport path 30, and turns with axle supported by the axis of rotation of the first motor 101. When the plural mediums Z more than two pieces are sent off by the pickup roller 21, the only upper side medium Z configured to contact with the separation roller 22 among the plural mediums Z is carried out to the transport path 30. When the plural mediums Z are transported by the turning of the separation roller 22, the separation pad 23 prevents the medium Z provided below the medium being transported to the transport path 30 by a friction occurring between the carrying upper side medium Z and the medium Z provided below the carrying upper side medium. The transport path 30 may include a feeding guide 31 configured to transport the medium Z loaded on the paper tray 10 to the ejection tray 60, an inversion feeding guide 32 configured to reverse the medium carried in the feeding guide 31, and a blade 33. The feeding guide 31 is a transport path like an abbreviation U character in cross section, as shown in FIG. 1. The feeding guide 31 is formed like that the medium Z loaded on the paper tray 10 like the surface of the medium Z facing upward is carried to let the surface of medium Z face outside in the transport path like an abbreviation U character in cross section, and is carried off to let the surface of the medium Z face downward. The inversion feeding guide 32 is configured to link middle and end of the feeding guide 31. The inversion feeding guide 32 is provided to let the backside of the medium Z carried by the ejection roller 43 that is part of the transport member face the outside of the transport path like an abbreviation U character in cross section of the feeding guide 31. Hereby it is enabled to reverse of the medium Z and to scan the backside of the medium Z by the scanning member 90. The blade 33 is configured to open and close the passage from the feeding guide 31 to the inversion feeding guide 32, and is able to open a one way of the passage from the feeding guide 31 to the inversion feeding guide 32.

The transport member 40 carries the medium sent off into the transport path 30 to the ejection tray 60, as shown in FIG. 1. The transport member 40 may include a feeding roller 41 configured to transport the medium Z sent off by the feeding guide 31 to an ejection roller 43 as mentioned later, a first pressure roller 42 provided against the feeding roller 41, an ejection roller 43 configured to eject the medium Z transported to a discharge position or sends off the inversion guide 32, a second pressure roller 44 provided against the ejection roller 43, and a driving member 47 (refer to FIG. 4 and FIG. 5) to drive the feeding roller 41 and the ejection roller 43. The feeding roller 41 and the ejection roller 43 are axle supported by a first shaft 45 and a second shaft 46 configured to be provided in free rotation each, and are able to transport or eject the medium Z on the transport path 30 by the turning of the first shaft 45 and the second shaft 46 as shown in FIG. 4.

The first pressure roller 42 and the second pressure roller 44 have the first additional material 58 and the second additional material 59 respectively. The first additional material 58 and the second additional material 59 are configured to let the medium Z be pressed the feeding roller 41 and the ejection roller 43.

Figure 4:
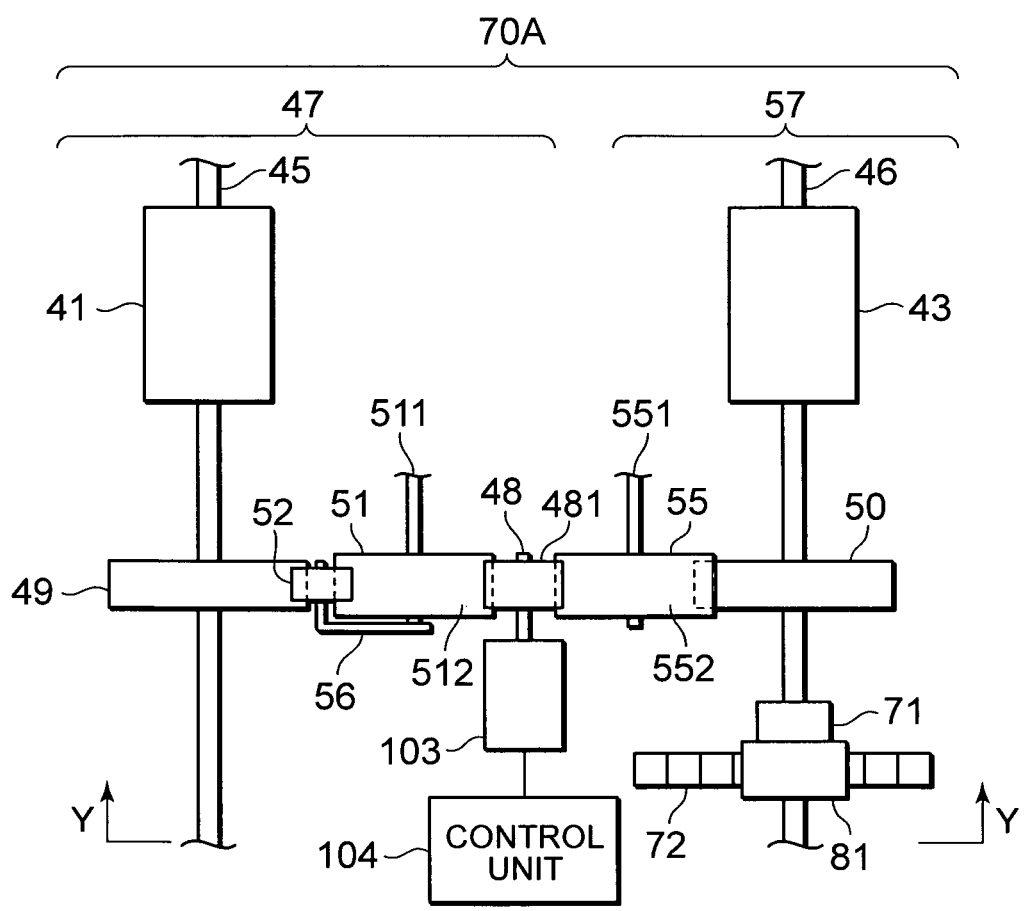
FIG. 4 is a plan view that is a planar view of a part of a transport member and a detaching member in the first embodiment.
Figure 5:
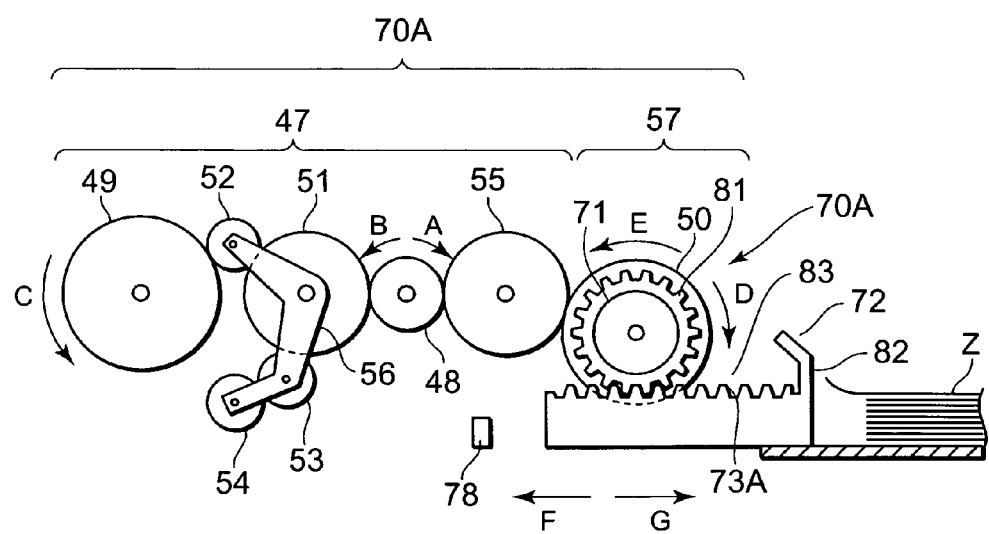
FIG. 5 is a view of the transport member and the detaching member from the Y-Y direction in FIG. 4.

The driving member 47 may include the third motor 103, the driving gear 48 configured to be fitted a central axis of the third motor 103 and transmit a driving of the third motor 103, the feeding gear 49 axle supported by the first shaft 45, and the first transmission gear 51 to the fifth transmission gear 55 for transmitting the driving force of the driving gear 48 to the feeding gear 49 and the ejection gear 50 as shown in FIG. 4 and FIG. 5. As shown in FIG. 4 and FIG. 5, a third cog 481 is configured to drive a first transmission gear 51 and a fifth transmission gear 55 which are provided adjacent to the third cog 481, and meshes a first cog 512 and a second cog 552 which are formed at the first transmission gear 51 and the fifth transmission gear 55 respectively, and is formed at the driving gear 48. The driving gear 48 is axle supported by the third motor 103 and turns in an A direction or in a B direction by the third motor 103 turning. When the medium Z is transported to the ejection tray 60, the driving gear 48 turns in the A direction as shown in FIG. 5, and when the medium Z is transported to the inversion feeding guide 32, the driving gear 48 turns in the B direction as shown in FIG. 5. As shown in FIG. 4, the feeding gear 49 is axle supported by the first shaft 45. When the driving gear 48 turns, the first shaft 45 turns by the feeding gear 49 turning through the first transmission gear 51 to the fourth transmission gear 54. The ejection gear 50 is axle supported by the second shaft 46. When the driving gear 48 turns, the second shaft 46 turns by the ejection gear 50 turning through the fifth transmission gear 55. The driven member 57 includes the second shaft 46 as the driven shaft member, the ejection gear 50 axle supported by the second shaft 46 configured to turn in driven motion by the fifth transmission gear 55 driving, the ejection roller 43 axle supported by the second shaft 46 moving the medium in an ejection direction (a direction of FIG. 5D) or in a drawing direction (a direction of FIG. 5E) as the transport member, and a torque limiter 71 also axle supported by the second shaft 46 has the fourth cog 81, as shown in FIG. 4 and FIG. 5. The torque limiter 71 turns with the turning of the second shaft 46, namely the torque limiter 71 turns with the turning of the ejection roller 43. When over the prescribed torque acts between two materials, the torque limiter 71 is able to intercept the transmission of this torque. When a force given to the torque limiter 71 by the tuning of the second shaft configured to axle supported the torque limiter 71 is bigger than a force given by the pushing member 72 configured to mesh the fourth cog 81, the torque limiter 71 idles and intercepts the transmission of the torque.

The first transmission gear 51 meshes the third cog 481 of the driving gear 48, and is axle supported in free motion by a shaft 511. The shaft 511 configured to axle support the first transmission gear 51 has a lever 56 like the abbreviation V character axle supported in free motion, as shown in FIG. 4 and FIG. 5. As shown in FIG. 5, the upper side of the lever 56 has the transmission gear 52 configured to mesh the first transmission gear 51. The underside of the lever 56 has the third transmission gear 53 configured to mesh the first transmission gear 51 and the fourth transmission gear 54 configured to mesh that third transmission gear 53. When the driving gear 48 turns in the A direction as shown in FIG. 5, the first transmission gear 51 turns counterclockwise, and lets the feeding gear 49 turn in a C direction by the second transmission gear 52 axle supported by the lever 56 moving counterclockwise and meshing the feeding gear 49.

When the driving gear 48 turns in the B direction as shown in FIG. 5, the first transmission gear 51 turns clockwise. The first transmission gear 51 configured to turn clockwise lets lever 56 move clockwise through the third transmission gear 53, and the fourth transmission gear 54 provided at the end of the underside of the lever 56 meshes the feeding gear 49. Therefore the feeding gear 49 turns in the C direction through the first transmission gear 51, the third transmission gear 53 and the fourth transmission gear 54. By this structure, if the driving gear turns in either the A direction or the B direction, the feeding roller 41 always turns in the C direction.

Figure 3:
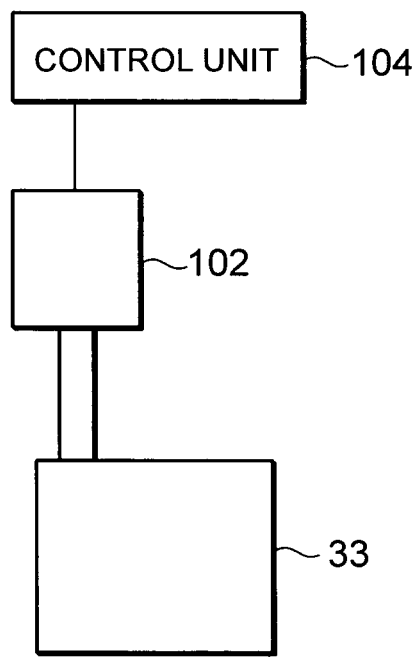
FIG. 3 is a plan view that is a planar view a part of a blade in the first embodiment.

The fifth transmission gear 55 is axle supported by a shaft 551, and is provided to mesh the driving gear 48 and the ejection gear 50. When the driving gear 48 turns in the A direction, the ejection gear 50 turns in a D direction, as shown in FIG. 3. When the driving gear 48 turns in the B direction, the ejection gear 50 turns in an E direction, as shown FIG. 3.

The ejection tray 60 in which lets the medium Z transported on the transport path 30 be loaded as shown in FIG. 1. The ejection tray 60 may include the material like a plane board configured with the size in capable putting the medium Z. The detaching member 70A may include the driving member 47, the driven member 57, the prevention member 78 and the pushing member 72, and has the function to move the pushing member 72.

The pushing member 72 has a rack 73A which has the fifth cog 83 configured to connect the fourth cog 81 formed at torque limiter 71, and has the contacting member 82 configured with the plane to push out the medium Z. The pushing member 72 is provided in a free slide along a surface of the medium in the upper side of the ejection tray 60 as the medium loaded member. Therefore, it is possible to form up the medium by that the contacting member 82 slides toward the medium Z which is a direction to leave from the ejection roller 43, as the medium, and contacts with the accumulation of the medium. The pushing member 72 is provided at the spot which is the underside of the ejection roller 43 and the upper side of the medium loaded up member 60. The pushing member 72 is able to slide in a F direction or in a G direction as shown in FIG. 5 through the turning of the torque limiter 71 by the connection of the rack 73A configured to include the fifth cog 83 and the fourth cog 81. In this embodiment, the pushing member 72 slides along the surface of the mediums of the ejection tray 60 as the medium loaded member.

The prevention member 78 is included in order that the pushing member 72 does not move over prescribed limits by the turning of the torque limiter 71. It is possible that the space for implementation becomes space-saving because the ejection roller 43, the ejection gear 50, and the torque limiter 71 are fixed on the same axis against the second shaft 46. The ejection roller 43 and the torque limiter 71 turn with the turning of the ejection gear 50. When the over prescribed torque adds the torque limiter 71 contacted with the prevention member 78 and the pushing member 72 as shown in FIG. 5, the torque limiter 71 idles against the second shaft 46 even if the second shaft 46 turns. When the ejection roller 43 turns in the direction (the direction of FIG. 5D) to eject the medium, the pushing member 72 stops in the prescribed position by the pushing member 72 operating independently against the turning of the ejection gear 50 and the ejection roller 43. Because the pushing member 72 has the function to guide the medium loaded up on the ejection tray 60, the loaded position of the medium is stabilized. The prevention member 78 is provided to stop the pushing member 72 at the prescribed position when the pushing member 72 moves in a direction of FIG. 5F, but the pushing member 72 may stop at the prescribed position when the pushing member 72 moves in a direction of FIG. 5G.

The scanning member 90 scans the image described on the one surface of the medium carried out on the transport path 30. The scanning member 90 may include a light source which is like line and radiates, a projection lens configured to project in reduction the reflected light configured to reflect from the mediums through plural mirrors, and a line sensor configured to make a reflected light configured to be projected in reduction photoelectric conversion outputs electricity as an image signal. The image scanning apparatus 1A and the document transport apparatus 2A may include a control unit 104 configured to control the turning of the first motor 101, the second motor 102, and the third motor 103.

With the image scanning apparatus 1A and the medium transport apparatus 2A, the movement method is explained when the both sides of medium Z is scanned. The control unit 104 lets drive the first motor configured to axle support the separation roller 22. The control unit 104 also lets turn the third motor 103 configured to axle support the driving gear 48 to turn the driving gear 48 in the A direction, as shown in FIG. 5. Because the blade 33 turns up an upper direction, the medium Z carried out from the feeding guide 31 is able to eject toward the ejection tray 60. Then the separation roller 22 drives by the first motor 101, and the pickup roller 21 sends off the medium Z loaded on the paper tray 10 to between the separation roller 22 and the separation pad 23. The medium Z sent off is carried out layer by layer by the separation roller 22 and the separation pad 23, and moves along the feeding guide 31. The medium Z configured to move along the feeding guide 31 is sent off by the feeding roller 41, and the image of the surface of the medium Z is scanned at the scanning member 90. The ejection roller 43 sends off the top side of the medium Z to the ejection tray 60, but when the end side of the medium Z is provided between the ejection roller 43 and the second pressure roller 44, the turning of the ejection roller stops by the driving gear 48 stopping to drive in the A direction, and the end side of the medium Z is held by the ejection roller 43 and the second pressure roller 44. When only the surface of the medium Z is scanned, the medium Z is carried out to the ejection tray 60 by the driving gear 48 continuing to drive in the A direction.

For scanning the back side of the medium, the driving gear 48 turns in the B direction shown in FIG. 5. The ejection gear 50 turns in the E direction shown in FIG. 5, and the ejection roller 43 turns to transport the medium for the inversion feeding guide 32. The blade 33 turns down an under direction. As shown in FIG. 5, the pushing member 72 configured to link the ejection roller 43 moves in the G direction as a direction of leaving from the ejection roller 43 that is part of the transport member by the ejection roller 43 turning in the E direction. Thus the medium Z which has possibilities to be drawn by the action of re-drawing of the ejection roller 43 and is loaded on the ejection tray 60, is pushed in the G direction, and is able to detach from the ejection roller 43. Hereby it is possible to prevent that the medium Z loaded on the ejection tray 60 is drawn to the ejection roller 43.

When the medium Z configured to be sent off to the inversion feeding guide 32 by the ejection roller 43 is carried out to the feeding guide 31, the back side of the medium Z is turning the side where the scanning member 90 is provided. The back side of the medium is scanned, and the medium Z is sent off to the side where the ejection roller 43 and the second pressure roller 44 provided. The feeding roller 41 always turns in the C direction even if the driving gear 48 turns in the B direction.

After scanning of the back side of the medium Z, the driving gear 48 turns in the A direction and the medium Z is carried out to the top side of the ejection tray 60 by the ejection roller 43. When the end of the medium Z comes between the ejection roller 43 and the second pressure roller 44, the driving gear 48 stops again to drive in the A direction, and the end side of the medium Z is held by the ejection roller 43 and the second pressure roller 44, and the driving gear 48 turns in the B direction. For the pushing member 72 moves in the G direction, it is possible to prevent that the medium loaded the ejection tray 60 is drawing to the ejection roller 43. The ejection gear 50 drives in the E direction, and the ejection roller 43 transports the medium Z to the inversion feeding guide 32 to let the surface of the medium Z turn down in an under direction at the ejection tray 60. Hereby the plural mediums Z are loaded up on the ejection tray 60 under the same accumulation condition of that the medium Z is loaded on the paper tray 10.

As described in the above the image scanning apparatus 1A, when the pushing member 72 in the detaching member 70A operates re-drawing of the ejection roller 43, the medium Z loaded in the ejection tray 60 is pushed to leave from the ejection roller 43, so it is possible to prevent that the medium Z is drawn, and to lineup the medium Z loaded on the ejection tray 60 by the contacting member 82 formed at the pushing member 72.

According to one aspect, the medium transport apparatus, the image scanning apparatus as the image processing apparatus, and an image forming apparatus that are capable of preventing a medium on an ejection tray from being drawn into an inversion transport path by a re-drawing action.

According to another aspect, the medium transport apparatus, the image scanning apparatus as the image processing apparatus, and an image forming apparatus include a composition of the medium transport apparatus described above and the scanning member configured to scan information on a medium.

According to another aspect, it is possible to provide the medium transport apparatus, the image scanning apparatus, and the image forming apparatus configured to avoid that the medium already drained in the eject tray is drawn into the transport path even if those apparatus operate the re-drawing action of the medium.

This embodiment may have applicability to the image forming apparatus. The image processing apparatus may include the image scanning apparatus or the image forming apparatus.

Second Embodiment

Figure 6:
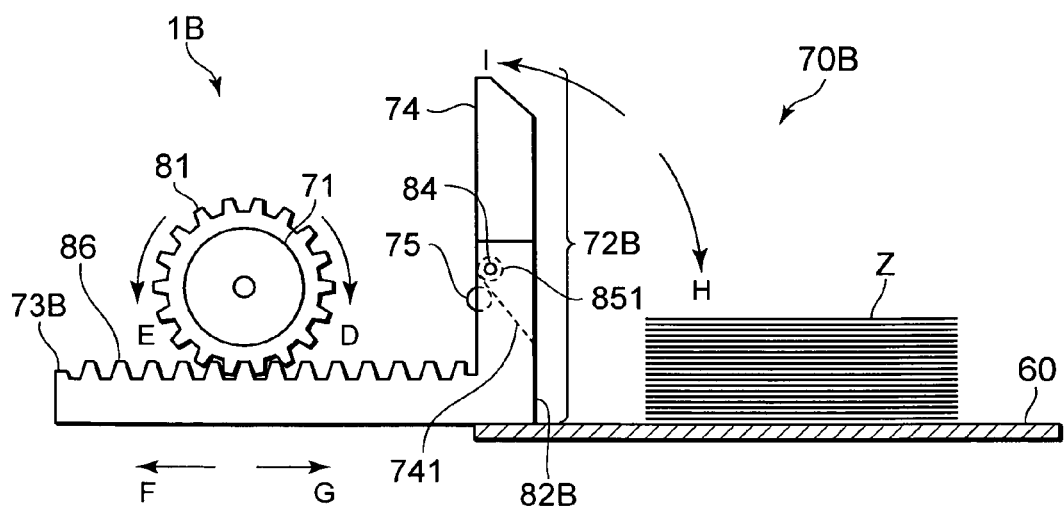
FIG. 6 is a side view showing the construction of a detaching member in a medium scanning apparatus in a second embodiment.
Figure 7:
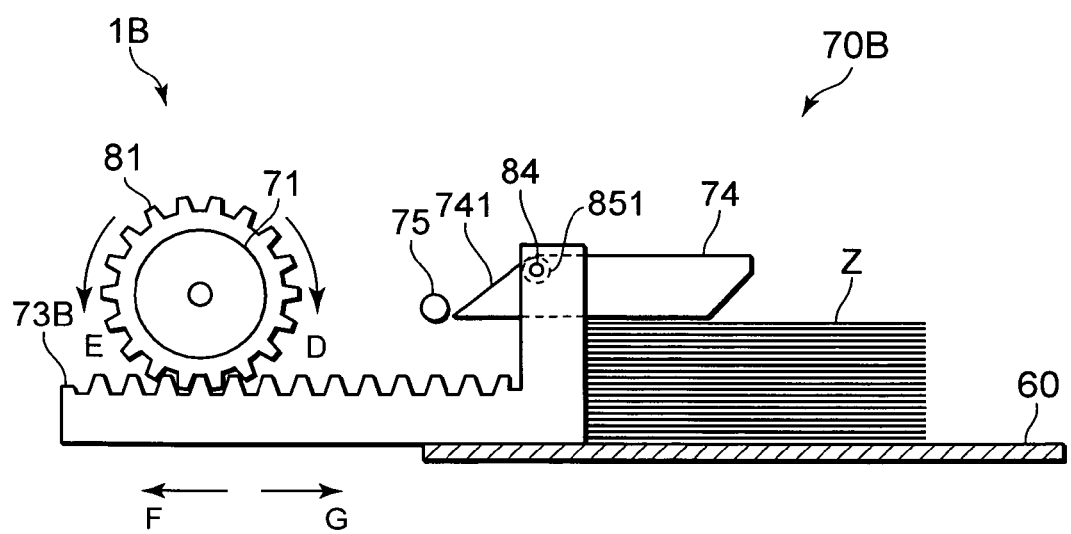
FIG. 7 is a side view showing a pushing action of a medium on an ejection tray, in the detaching member of the medium scanning apparatus in the second embodiment.

An image scanning apparatus and a medium transport apparatus of a second embodiment of this application are explained referring to FIG. 6 and FIG. 7. The image scanning apparatus of the second embodiment may include at least the paper tray 10 similar to the first embodiment as shown in FIG. 1, the discharge member 20, the transport path 30, the transport member 40 (the transport roller), the ejection tray 60, and the scanning member 90. The medium transport apparatus of second embodiment may include at least the transport member 40, and the ejection tray 60, as shown in FIG. 1. The image scanning apparatus and the medium apparatus of the second embodiment are different from the image scanning apparatus 1A and the medium apparatus 2A of the first embodiment as described above, including the detaching member 70B besides. Hereinafter, the detaching member 70B as the difference is described. And an explanation of similarity structure of the image scanning apparatus of the second embodiment and the image scanning apparatus 1A, and the medium apparatus of the second embodiment and the medium apparatus 2A are omitted.

In this embodiment, the detaching member 70B may include the driving member 47, the driven member 57, the pin 75 as the abutting member, and the pushing member 72B. As shown in FIG. 6, the pushing member 72B may include the contacting member 82B, the folding board 74 as the restriction member, the fulcrum point 84 configured to connect the contacting member 82B with the folding board 74 to let the folding board 74 in free motion against the contacting member 82B, and the luck 73B configured to be formed together said the contacting member 82B and is provided slidably against the ejection tray 60 as the medium loaded member. The folding board 74 as the restriction member, has the first abutted member 741 configured to contact with the pin 75 with slide moving of the pushing member 72B. The folding board 74 is movable to a direction to approach or leave for the medium loaded member. The torque limiter 71 of the detaching member 70B is the same structure as the torque limiter 71 of the detaching member 70A of the first embodiment described above.

The rack 73B is formed together the contacting member 82B in this embodiment. The rack 73B pushes out the medium Z loaded on the ejection tray 60, and is formed the sixth cog 86 configured to mesh the fourth cog 81 of the torque limiter 71. The rack 73B steps forward and retreat in the F direction or in the G direction as shown in FIG. 6, in conjunction with the turning of the torque limiter 71. The folding board 74 pushes the upper side of medium Z loaded on the ejection tray, and detaches the medium Z toward the under side of the ejection tray 60, and is the perpendicular board supported by the rack 73B to be capable of folding toward the side of the ejection tray 60. The folding board 74 is biased the torsion spring to turn in a H direction as shown in FIG. 6. In this embodiment, the folding board 74 is biased the first spring 851 in the H direction, but the folding board 74 may be biased by own weight of the folding board 74.

The pin 75 as the abutting member is rod-like material provided at the side of the ejection tray 60. The pin 75 pushes the abutted member formed at the under side of the folding board 74 by the movement of the rack 73B in the F direction, and to let the folding board 74 turn in an I direction, and to provide the folding board 74 perpendicularly against the medium mounting surface of the ejection tray 60.

The method of operation of the detaching member of the image scanning apparatus will be described in case of scanning both sides of the medium Z.

When the upper side of the medium Z is scanned, the driving gear 48 of the driving member turns in the A direction as shown in FIG. 4. In this case, as the ejection gear 50 turns in the D direction as shown in FIG. 5, the torque limiter 71 turns in the D direction too and the rack 73B moves in the F direction. The folding board 74 supported by the rack 73B moves in the F direction too. The pin 75 contacts with the abutted member formed at the under side of the folding board 74, and the folding board is pushed by the pin 75 to turn in the I direction, and gets up perpendicularly.

The driving gear 48 turns in the B direction when the medium Z sandwiched between the ejection roller 43 and the second pressure roller 44 is carried out to the inversion feeding guide as a drawing direction. With the driving gear 48 turning in the B direction, the ejection roller 43 turns in the E direction (referring to FIG. 5), and the rack 73B moves in the G direction. Thus, the ejection roller 43 carries out the medium sandwiched with the second pressure roller 44 to the inversion feeding guide, and the rack 73B moving in the G direction pushes out the medium loaded on the ejection tray 60. When the rack 73B moves in the G direction, the folding board 74 is able to fall down in the H direction by the first spring 851, and to immobilize the medium Z from the upper side, because the folding board 74 supported by the rack 73B approaches the medium loaded member 60, and the abutted member 741 formed at the under side of folding board 74 detaches from the pin 75 which is the abutting member, and does not be seized. Therefore if the rack 73B is pushed out in the G direction, the medium Z does not curve to the upper side and is able to be pushed out surely because the folding board 74 immobilizes the medium Z from upper side.

Third Embodiment

Figure 8:
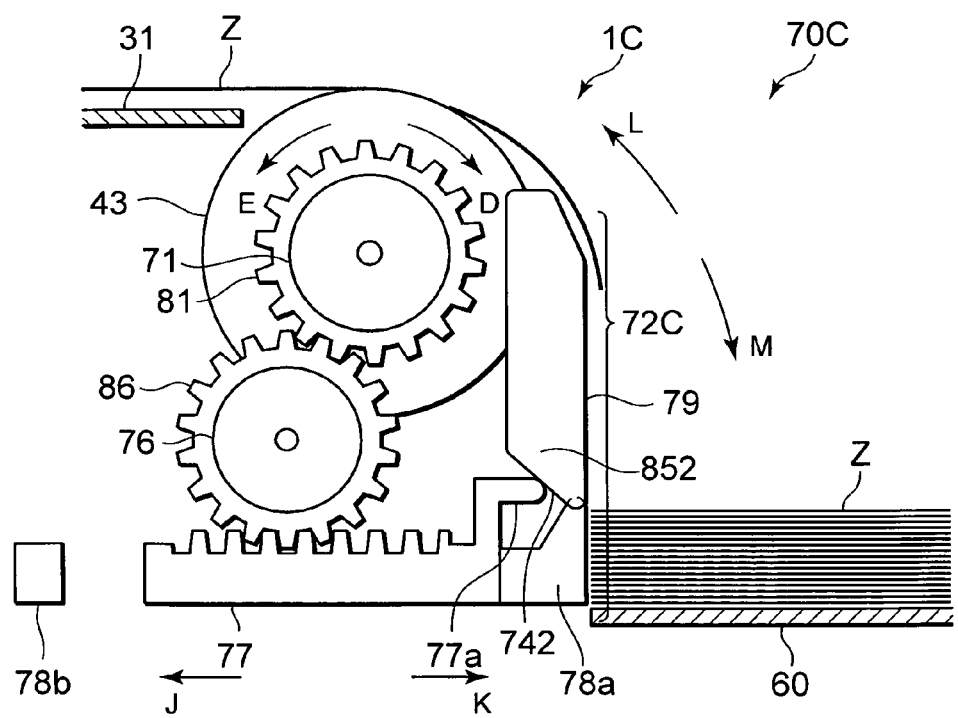
FIG. 8 is a side view showing the construction of a detaching member in a medium scanning apparatus in a third embodiment.
Figure 9:
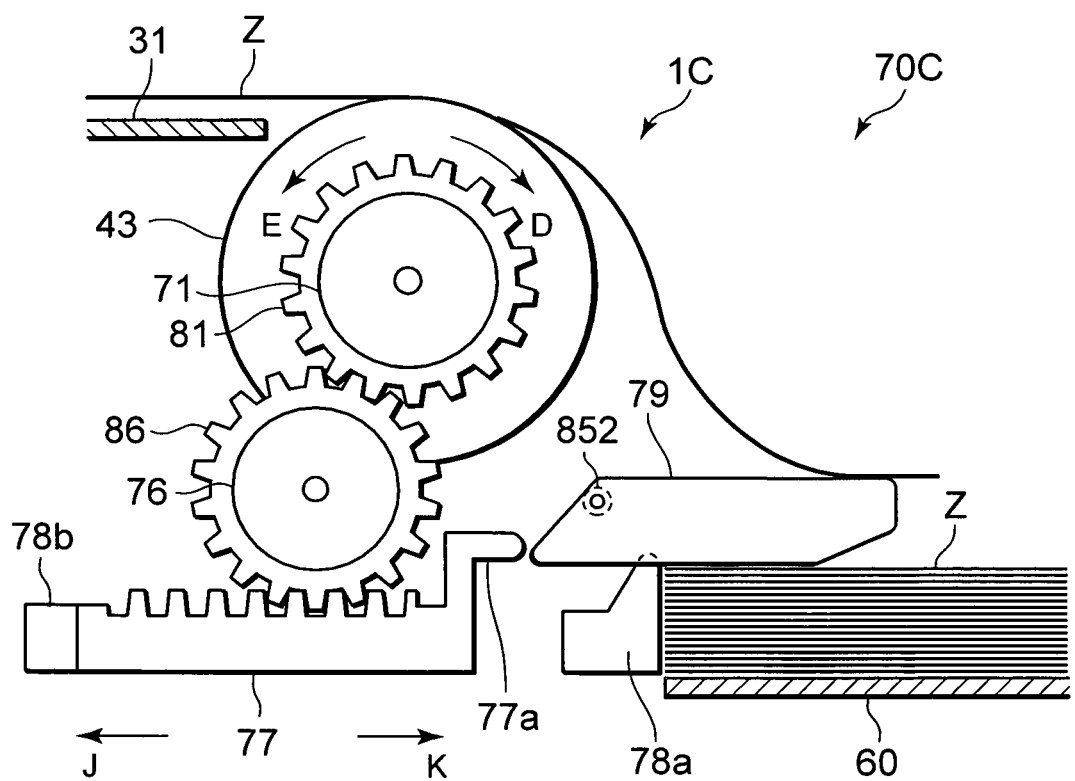
FIG. 9 is a side view showing the pushing action of a medium on the ejection tray, in the detaching member of the medium scanning apparatus in the third embodiment.

An image scanning apparatus and a medium transport apparatus of a third embodiment of this application will be described referring to FIG. 8 and FIG. 9. The image scanning apparatus of the third embodiment may include at least the paper tray 10 similar to the first embodiment as shown in FIG. 1, the discharge member 20, the transport path 30, the transport member 40 (the ejection roller), the ejection tray 60, and the scanning member 90. The medium transport apparatus of the third embodiment may include at least the transport member 40, the ejection tray 60, and the movement member, as shown in FIG. 1. The image scanning apparatus of the third embodiment and the medium transport apparatus are different from the image scanning apparatus 1A and the medium transport apparatus of the first embodiment as described above, including the detaching member 70C. Hereinafter, the detaching member 700 as the difference will be described. An explanation of similarity structure of the image scanning apparatus of the third embodiment and the image scanning apparatus 1A, and the medium transport apparatus of the third embodiment and the medium transport apparatus are omitted.

The detaching member 70C may include the driving member 47, the driven member 57, and the pushing member 72C. In addition, the driven member 57 has the sixth transmission gear 76 configured to turn in conjunction with the torque limiter 71. As shown in FIG. 8, the pushing member 72C may include the folding board 79 as the restriction member, the rack 77 configured to move in conjunction with the sixth transmission gear 76, the prevention member 78a and 78b configured to set the span of slide moving of the rack 77. The torque limiter 71 of the detaching member 70C is same structure as the torque limiter 71 of the detaching member 70A of the first embodiment as described above.

The sixth transmission gear 76 is provided to mesh torque limiter 71 and the rack 77, and turns in conjunction with the turning of the torque limiter 71, and moves the rack 77 in a J direction or in a K direction. The rack 77 has the projection 77a configured to project the top side (the side of the ejection tray 60), and meshes the sixth transmission gear 76, and moves in the J direction or in the K direction, and pushes the underside of the folding member. The prevention member 78a and 78b limit the movement of the rack 77 in the J direction or in the K direction as shown in FIG. 8, and are provided to divide into the J direction and into the K direction against the rack 77. Also the prevention member 78a limits that the medium Z loaded on the ejection tray 60 moves the side in which the ejection roller 43 is provided, as shown in FIG. 8. The folding board 79 pushes the upper side of medium Z loaded the ejection tray 60, and detaches the medium Z toward the underside of the ejection tray 60. The folding board 79 is the perpendicular board supported by the ejection tray 60 to be capable of folding toward the side of the ejection tray 60, and is biased to turn in a M direction at all times by the second spring 852. The upper side of the prevention member 78a and the lower side of the folding board 79 are pectinate to prevent the medium Z penetrating from between the prevention member 78a and the folding member 79, and when the folding board 79 is perpendicular, the pectination formed at the upper side of the prevention member 78a and the lower side of the folding board 79 is not to contact with each other.

The method of operation of the detaching member 70C will be described in case of scanning both sides of the medium Z. When the both sides of the medium Z is scanned, the driving gear 48 of the driving member turns in the A direction as shown in FIG. 5. For the discharge gear 50 turns in the D direction as shown in FIG. 5, the torque limiter 71 turns in the D direction too. The sixth transmission gear configured to mesh the torque limiter 71 turns to move the rack 77 in the K direction. The projection 77a configured to move in the K direction pushes the bottom head of the folding board 79, and the folding board 79 turns in a L direction and gets up perpendicularly. The front end side of medium Z configured to be sent off by the ejection roller 43 covers the folding board 79 as shown in FIG. 8.

When the ejection roller 43 and the second pressure roller 44 sandwich the back end side of the medium Z and the medium Z is transported to the inversion feeding guide, the driving gear 48 turns in the B direction. With the driving gear 48 turning in the B direction, the ejection roller 43 turns in the E direction and the rack 77 moves in the J direction. The lower side of the folding board configured to be pushed by the projection 77a of the rack 77 turns in the M direction by the biasing force of the second spring 852 and the medium Z configured to be transported to the feeding guide puts on the upper side of the folding board 79 as shown in FIG. 9. The folding board 79 configured to turn in the M direction pushes the medium Z loaded on the ejection tray 60 toward the underside of the ejection tray 60, and detaches from the ejection roller 43. In this way, because the folding board 79 stands between the medium Z transported to the inversion feeding guide and the medium Z loaded on the ejection tray, it is possible to prevent drawing the medium Z loaded on the ejection tray into the ejection roller.

This invention is not to limit the embodiment described above. As the third embodiment, in accordance with the operating of positive and inverse rotation of the ejection roller 43, the sixth transmission gear 76 configured to mesh the sixth cog 86 configured with torque limiter 71 is able to relate to increase the speed against the torque limiter 71 due to the detaching member 70 operate quickly. This application is not to limit in case of the medium scanning apparatus described in embodiment, and it is possible that this application uses as an image scanning apparatus.

What is claimed is:

1. A medium transport apparatus, comprising:
   transport rollers configured to transport a medium in a discharge direction or in a drawing direction;
   a medium loaded member configured to accept a medium transported in the discharge direction by the transport rollers;
   a pushing member that includes a contacting member configured to contact with one end of the medium on the medium loaded member, and being slidable with respect to the medium loaded member;
   a driving member configured to drive the transport rollers and the pushing member; and
   a control member that controls the driving member,
   wherein the control member controls the driving member so that the pushing member slides in a first direction away from the transport rollers so as to position the pushing member distal to the transport rollers, when the transport rollers are rotating in a first rotation direction and in which the medium is transportable in the drawing direction, and the control be controls the driving member so that the pushing member slides in a second direction opposite to the first direction so as to position the pushing member proximal to the transport rollers, when the transport rollers are rotating in a second rotation direction opposite to the first rotation direction and in which the medium is transportable in the discharge direction.

2. The medium transport apparatus of claim 1, further comprising:
   a driven member including a torque limiter that transmits a driving force from the driving member to the pushing member therethrough; and
   a holding member configured to stop a movement of the pushing member and hold the pushing member in a prescribed position,
   wherein the transport rollers include a first roller and a second roller.

3. The medium transport apparatus of claim 2, wherein an axis of the torque limiter substantially coincides with an axis of the first roller.

4. The medium transport apparatus of claim 2, wherein the holding member is disposed upstream of the contacting member in the discharge direction, and stops upstream sliding movement of the pushing member in the second direction, to position the pushing member proximal to the driving member and in the prescribed position.

5. An image processing apparatus, comprising:
   the medium transport apparatus described in claim 1; and
   an image processing member configured to operate an image processing of the medium transported by the medium transport apparatus.

6. The image processing apparatus of claim 5, wherein the image processing member is an image scanning member.

7. The medium transport apparatus of claim 1, wherein the contacting member extends in a loaded direction in which the medium is loaded in the medium loaded member, and the pushing member is slidable in a substantially orthogonal direction with respect to the loaded direction.

8. The medium transport apparatus of claim 1, further comprising:
   second transport rollers disposed upstream of the transport rollers in the discharge direction; and
   a gear train configured to transmit a driving force of the driving member to the second transport rollers,
   wherein the second transport rollers rotate in one direction when the transport rollers are rotating in the first rotation direction, and rotate in the one direction when the transport rollers are rotating in the second rotation direction.

9. The medium transport apparatus of claim 1, wherein the pushing member is slidable in a linear direction.

\* \* \* \* \*